(12) United States Patent
Katz et al.

(10) Patent No.: US 8,176,759 B2
(45) Date of Patent: May 15, 2012

(54) THEFT PREVENTION DEVICE FOR TWO-WHEELED VEHICLES

(76) Inventors: Eyal Katz, Tel Aviv (IL); Noam Harel, Bnei-Brak (IL); Kfir Feldman, Tel-Aviv (IL)

( * ) Notice: Subject to any disclaimer, the term of this patent is extended or adjusted under 35 U.S.C. 154(b) by 121 days.

(21) Appl. No.: 12/717,599

(22) Filed: Mar. 4, 2010

(65) Prior Publication Data
US 2010/0206022 A1 Aug. 19, 2010

Related U.S. Application Data

(63) Continuation-in-part of application No. PCT/IL2008/001201, filed on Sep. 7, 2008.

(60) Provisional application No. 60/935,900, filed on Sep. 6, 2007.

(51) Int. Cl.
E05B 71/00 (2006.01)

(52) U.S. Cl. .............. 70/233; 70/14; 70/18; 70/202

(58) Field of Classification Search .............. 70/14, 18, 70/202, 203, 211, 212, 228, 233, 360, 361, 70/387; 292/32, 33, 37, 41, 42, 137, 138, 292/140, 145, 156, 159, 240, 250, DIG. 37
See application file for complete search history.

(56) References Cited

U.S. PATENT DOCUMENTS

| | | | | |
|---|---|---|---|---|
| 1,285,827 A * | 11/1918 | Staack | | 70/195 |
| 2,419,725 A | 4/1947 | Nosser | | |
| 3,368,694 A | 2/1968 | Morris et al. | | |
| 3,410,122 A * | 11/1968 | Moses | | 70/58 |
| 4,426,861 A * | 1/1984 | Chillis | | 70/39 |
| 4,660,394 A | 4/1987 | Wu | | |
| 5,036,683 A * | 8/1991 | Geuvjehizian | | 70/18 |
| 5,042,754 A * | 8/1991 | Heath | | 244/224 |
| 5,347,835 A * | 9/1994 | Dewey | | 70/202 |
| 5,511,399 A * | 4/1996 | Lynn | | 70/19 |
| 7,334,824 B2 * | 2/2008 | Sundberg et al. | | 292/336.3 |
| 7,661,280 B1 * | 2/2010 | Weyland | | 70/233 |
| 2002/0077377 A1 | 6/2002 | Zhang et al. | | |
| 2002/0095959 A1 | 7/2002 | Meekma et al. | | |
| 2003/0066320 A1 * | 4/2003 | Vito | | 70/233 |
| 2009/0301145 A1 * | 12/2009 | Valerio et al. | | 70/21 |

OTHER PUBLICATIONS

International Search Report of the International Searching Authority dated Dec. 16, 2009 for PCT/IL2008/001201.
Written Opinion of the International Searching Authority dated Dec. 16, 2009 for PCT/IL2008/001201.

* cited by examiner

*Primary Examiner* — Lloyd Gall
*Assistant Examiner* — Ifeolu Adeboyejo
(74) *Attorney, Agent, or Firm* — The Law Office of Michael E. Kondoudis

(57) ABSTRACT

Theft prevention device for enabling to lock the handlebar grip and the brake-lever of a two-wheeled vehicle, where the brake-lever is movably connected to the handlebar, to prevent stealing of the vehicle. The device may comprise a housing comprising at least two openings; a handlebar cuff that enables slidably attaching to the housing through the openings and cuffing of the handlebar grip therein; a brake-lever cuff that enables slidably attaching to the housing through the openings and, cuffing of the brake-lever therein; and a lock assembly that is operatively associated with the cuffs. The lock assembly enables locking the cuffs in a position where the cuffs cuff the handlebar grip and the brake-lever. To install the theft prevention device the cuffs should be approximate to one another, and then the user may lock the cuffs in the approximated cuffing position, using the lock assembly.

14 Claims, 14 Drawing Sheets

THEFT PREVENTION DEVICE FOR TWO-WHEELED VEHICLES

CROSS REFERENCE TO RELATED APPLICATION

This application is a CIP of International Patent Application No. PCT/IL2008/001201 filed Sep. 7, 2008; which in turn claims the benefit of U.S. Provisional Patent Application No. 60/935,900 filed Sep. 6, 2007, titled: "Theft Deterrent Device for a Motorbike", both of which are incorporated herein by reference in their entirety.

FIELD OF THE INVENTION

The present invention relates generally to the field of theft prevention devices and more particularly to the field of theft prevention devices for two-wheeled vehicles.

BACKGROUND OF THE INVENTION

Two-wheeled vehicles such as motorbikes, scooters and bicycles are stolen at twice the rate of automobiles, and less than half of those stolen are recovered. Therefore, deterring and preventing theft is an ongoing concern for motorbike owners.

The most commonly recommended theft deterrent and prevention method is to lock the bike to a stationary, secure object that cannot be easily dismantled or moved. Usually, a chain or cable is threaded through a wheel or a chain loop of the motorbike and around a fixed or difficult-to-move object, such as a tree, a signpost, an in-ground anchor, or a light pole, and the ends of the chain or cable are locked together. Such an arrangement is also conveniently moved from one motorbike to another, which is an advantage if, for example, one rides more than one motorbike.

However, if there is no suitable object available to which the chain or cable can be affixed, such a method is for less effective. Furthermore, the weight and bulk that makes a cable or chain sturdy enough to withstand tampering may also make the cable or chain awkward to transport. And threading a chain or cable to a motorbike that is hot and dusty from recent use is simply inconvenient and uncomfortable.

Other locks intended to prevent or deter the theft of motor bikes are also known.

For example, a disc brake lock, a small, portable lock that fits on the disc of the brake of a motorbike, is more quickly engaged and disengaged than a chain or cable lock. However, users have two complaints regarding disc brake locks. Firstly, as a disc brake lock is small and unobtrusive and its location on the wheel is not obvious, it is easy for the user to forget that the disc brake lock is engaged. Secondly, and for the same reasons, a disc brake lock does not provide a clearly visible deterrent to would-be thieves.

There are also locks that may be integrated into one of the handlebar mounted controls, for holding the control in a position that prevents the operation of the motorbike. For example, JP2005349882 discloses a device installed on the clutch lever assembly for locking a clutch lever against the handlebar. Again, the location and size of this type of lock device may not provide a clearly visible deterrent to would-be thieves. Furthermore, the integrated nature of such devices makes their use with more than one motorbike impractical, and may even preclude their use with another motorbike.

Another group of locks is handlebar-mounted locks, which have an upper and a lower piece that join together to clasp the brake or clutch lever and the corresponding handlebar grip. Handlebar-mounted locks have a general configuration to hold a lever in a position that renders a motorbike inoperable, and can be easily mounted on a motorbike. However, in order to ensure a snug and secure fit, further alterations are often required to adapt an individual handlebar-mounted lock to a specific motorbike. Alterations such as adhering foam segments to the inner surface of the lock are often permanent; therefore, a specific handlebar-mounted lock becomes tailored for use with only a specific motorbike. Furthermore, a handlebar-mounted lock may be of an attention grabbing color so the user is unlikely to forget its presence; however, the small size of such devices is not likely to put off a would-be thief, nor does it inspire confidence in the user that the motorbike is well protected.

SUMMARY OF THE INVENTION

The present invention, in some embodiments thereof, provides a theft prevention device for enabling to lock a handlebar grip and a brake-lever of a two-wheeled vehicle such as a motorbike, a scooter or a bicycle, where the brake-lever is movably connected to the handlebar, to facilitate in preventing an unauthorized user from stealing said vehicle or using it.

According to some embodiments of the invention, the theft prevention device may comprise:
  a housing comprising at least two openings;
  a handlebar cuff that enables slidably attaching to said housing through said openings and, together with the housing, enables cuffing the handlebar grip therein;
  a brake-lever cuff that enables slidably attaching to said housing through said openings and, together with the housing, enables cuffing the brake-lever therein; and
  a lock assembly that is operatively associated with said cuffs, wherein said lock assembly enables locking the cuffs in a position where the cuffs are engaged so that they cuff the handlebar grip and the brake-lever.

According to some embodiments of the invention, the lock assembly may comprises at least one pin plate comprising at least one plate channel, which is perforated therein; at least one pin, movably connected to said plate, wherein each pin is movably connected to the plate through said plate channel, which enables the pin to move within the channel; and a lock button, operatively associated with said pin plate. According to these embodiments, the at least one plate channel may be angular, constructed of at least two integrally connected channels that create and angle therebetween to allow the pins to protrude from the plate once reaching one end of the plate channel and to withdraw inwardly once reaching the other end of the plate channel. Additionally, the plate may enable the pins to protrude outwardly from the plate along a predefined "X" axis, when the plate is moved along a predefined "Y" axis in one direction and to withdraw inwardly towards the plate when the plate is moved in an opposite direction along the "Y" axis, where each of said handlebar cuff and brake-lever cuff comprises at least one serrated channel, enabling the pins to insert therethrough, once the pins are in a protruding position, and thereby locking the cuffs in a locked position cuffing the grip and brake-lever. The lock button may enable moving the pin plat back and forth along the "X" direction to lock and unlock the cuffs.

According to some embodiments of the invention, the lock assembly may further comprise a first core half and a second core half enabling to attach to one another while holding the pin plate and said at least one pin therein. Each of said core halves may comprise at least one niche enabling to create at least one perforation once the two halves are attached, through which the at least one pin protrudes in the locked position of said at least one pin.

According to some embodiments of the invention, the cuffs may further comprises at least one hole, positioned in such a location that enables each hole to be situated above said at least one pin enabling to lock the sliding movement of the cuffs along the "Z" axis by allowing each pin to be inserted through each hole in the pin's protruding position.

According to some embodiments of the invention, the "Z" axis may be substantially perpendicular to the "Y" axis, allowing the plate to be moved along a perpendicular axis to the movement axis of the cuffs.

According to some embodiments of the invention, the "Z" axis may be substantially perpendicular to the "X" axis, allowing the plate to be moved along a perpendicular axis to the protrusion movement axis of the pins.

According to some embodiments of the invention, the "Z" axis may be substantially perpendicular to the "Y" axis allowing the plate to be moved along a perpendicular axis to the movement axis of the cuffs, where the "Y" axis is substantially perpendicular to the "X" axis, allowing the plate to be moved along a perpendicular axis to the protrusion movement axis of the pins, wherein the "X" axis is also substantially perpendicular to the "Z" axis.

According to some embodiments of the invention, the lock button of the lock assembly may enable moving the pin plate along the "X" direction to lock and unlock the cuffs by moving along the same "X" axis, thereby pushing the pin plate when the lock button is pressed.

According to some embodiments of the invention, the lock assembly may further comprise a connecting member that is movably connected at one end to the lock button and at the other end to the pin plate, thereby enabling to transmit the pressing movement of the lock button to the movement of the plate, which in tern transmits the pressing movement to each pin to enable the pin to protrude from the plate.

According to some embodiments of the invention, pressing of the lock button along a predefined "Y" axis, may enable the connecting member to transmit the pressing movement of the lock button along the "Y" axis into the movement of the plate along a substantially perpendicular "X" axis. For that purpose, the connecting member may be L shaped.

According to some embodiments of the invention, the theft prevention device may further comprise at least one reinforcement strap, wherein said reinforcement strap is disposed within an inner wall of at least one of the cuff. The reinforcement strap may comprise at least one serrated channel adapted to fit the positioning of each of the cuffs' serrated channels to enable receiving of the at least one pin of the lock assembly therein, to lock the cuffs to the handlebar grip and brake-lever.

According to some embodiments of the invention, each pin may have two protruding ends enabling to connect to one another through a connector, wherein said connector is movably inserted through said plate channel, thereby allowing the pin to move along the plate channel.

According to some embodiments of the invention, the lock button may comprise an external cylinder and an internal cylinder, coaxially engaged therein.

According to some embodiments of the invention, at least a part of said lock assembly may be housed by the housing.

According to some embodiments of the invention, the theft prevention device may further comprise at least one holding member, which enables covering a part of the cuff that is held by the user, wherein said at least one holding member is attached to at least one of the cuffs. The holding member may be a piece of material of high friction situated at the external side of the cuff, so as to allow the user to grab this part when holding the cuff. The material may be, for instance, leather, cloth, rubber, etc.

According to some embodiments of the invention, the interior surface of at least one of the cuffs may be enhanced with a heavy-duty memory foam material, which provides protection against accidental scratching and marring of at least one of: the brake-lever and handlebar grip caused by the repeated installation of the theft prevention device.

According to some embodiments of the invention, the theft prevention device may further comprise at least one pulling-resistance mechanism, which facilitates in preventing an unauthorized person from removing the cuffs from their corresponding brake-lever and handlebar grip. The pulling-resistance mechanism may comprise at least one protruding member that protrudes from at least one of the housing's sides; at least one holder enabling to movably hold the protruding member; and at least one pivot movably connecting said protruding member to said holder. The housing may correspondently, comprise a pulling-resistance mechanism's opening enabling the protruding member to protrude therefrom, where the protruding member enables attaching to the surface of at least one of: the grip and the brake-lever, once the cuffs are cuffed to the brake-lever and handlebar grip, when a pulling force is applied on at least one of: the handlebar grip and the brake-lever.

According to some embodiments of the invention, the handlebar cuff and the brake-lever cuff may enable engaging with one another, in an interlocking manner once pressed against each other to lock the device, to form the locked position.

According to other embodiments of the invention, the handlebar cuff and the brake-lever cuff may enable engaging with one another, in a configuration in which one of said cuffs envelopes the other, to form the locked position.

According to some embodiments of the invention, the housing shape may create two sunken parts, where one of the parts is designed to receive the handlebar grip and the other part is designed to receive the brake-lever.

The present invention, in some non-limiting embodiments thereof, further provides a method of locking the handlebar grip and the brake-lever of a two-wheeled vehicle, using the theft prevention device. According to these embodiments, the method may comprise: (i) sliding the handlebar cuff over the handlebar grip so that the handlebar cuff encircles the grip; (ii) sliding the brake-lever cuff over the brake-lever so that the brake-lever cuff encircles the brake-lever; (iii) cuffing the handlebar grip and the brake-lever by approximating the cuffs to one another by sliding said cuffs through the openings of said housing along a predefined "Z" axis, thereby enabling the two cuffs to engage with one another; and (iv) pushing the lock button, thereby enabling to lock the cuffs in the approximated cuffing position.

BRIEF DESCRIPTION OF THE FIGURES

The subject matter regarded as the invention will become more clearly understood in light of the ensuing description of embodiments herein, given by way of example and for purposes of illustrative discussion of the present invention only, with reference to the accompanying figures, wherein.

Figure 1:
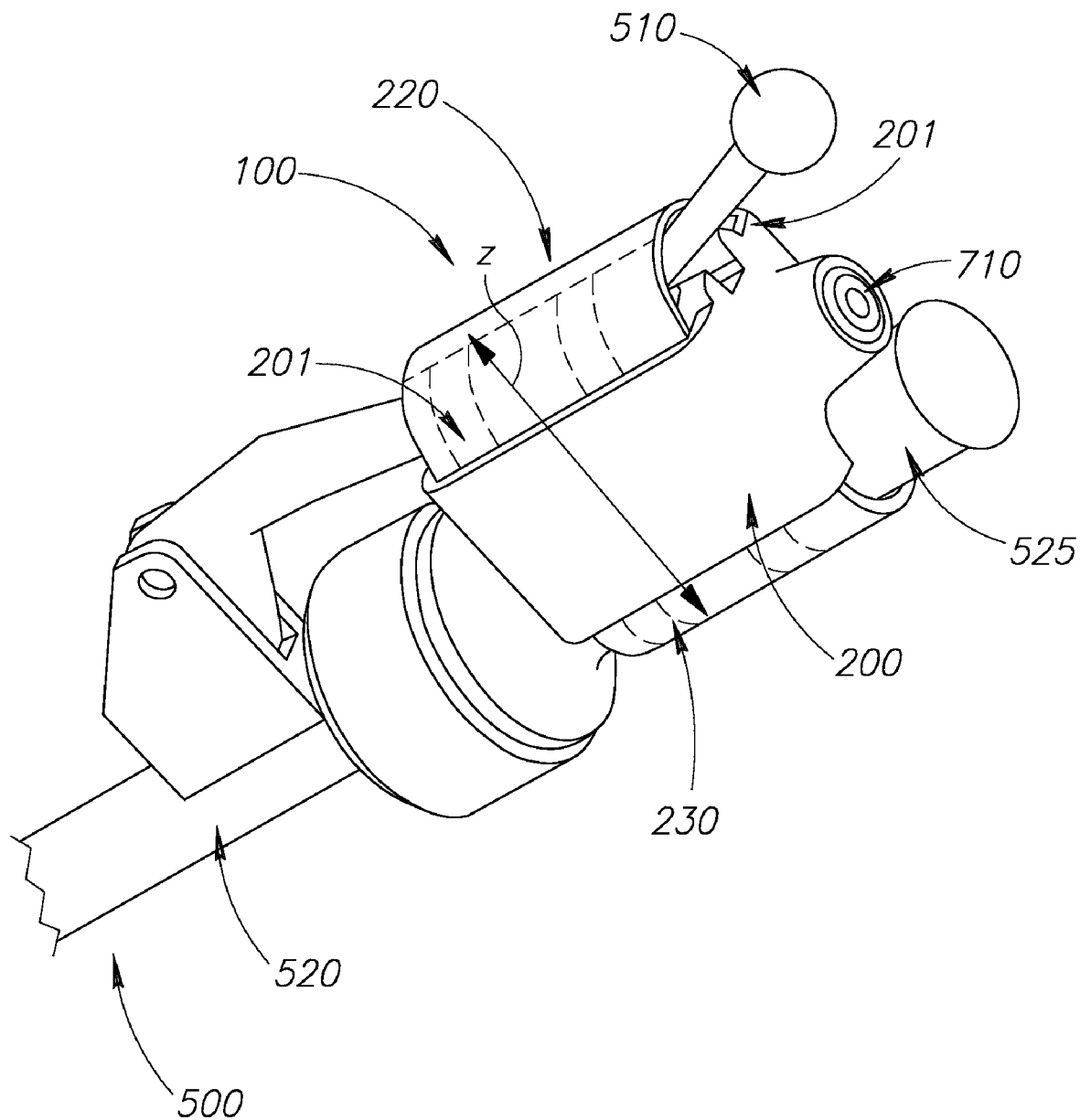
FIG. 1 is an isometric view of a theft prevention device for a two-wheeled vehicle, according to some embodiments of the present invention, mounted on a motorbike.

The figures together with the description make apparent to those skilled in the art how the invention may be embodied in practice.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF SOME EMBODIMENTS OF THE INVENTION

It is to be understood that an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It is understood that the phraseology and terminology employed herein is not to be construed as limiting and is for descriptive purpose only.

The principles and uses of the teachings of the present invention may be better understood with reference to the accompanying description, figures, and examples.

It is to be understood that the details set forth herein should not be construed as limiting any applications of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, integers or groups thereof and that the terms are not to be construed as specifying components, features, steps or integers.

The phrase "consisting essentially of", and grammatical variants thereof, when used herein, is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not to be construed as there being only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" refers to manners, means, techniques and procedures for accomplishing a given task including, but is not limited to those manners, means, techniques and procedures either known to, or readily developed from known manners, means, techniques and procedures by practitioners of the art to which the invention belongs.

The descriptions, examples, methods, and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The present invention, in some non-limiting embodiments thereof, provides a theft prevention device 100 for a two-wheeled vehicle 500 such as a motorbike, a scooter or a bicycle, serving as a lock and a deterring element, by enabling to prevent the movement of the vehicle's 500 brake-lever 510 and possibly also of the handlebar grip 525 (if it is used as a gas handle). The theft prevention device 100 may facilitate in overcoming shortcomings of the above-mentioned, currently available locks.

A feature of the present invention is that it is versatile enough to use with different types of two-wheeled vehicles (e.g. different types of motorbikes, scooters or bicycles). A theft prevention device 100 for a two-wheeled vehicle 500 according to embodiments of the present invention may be readily moved from vehicle to vehicle, requiring neither permanent nor temporary alterations prior to use.

Figure 2:
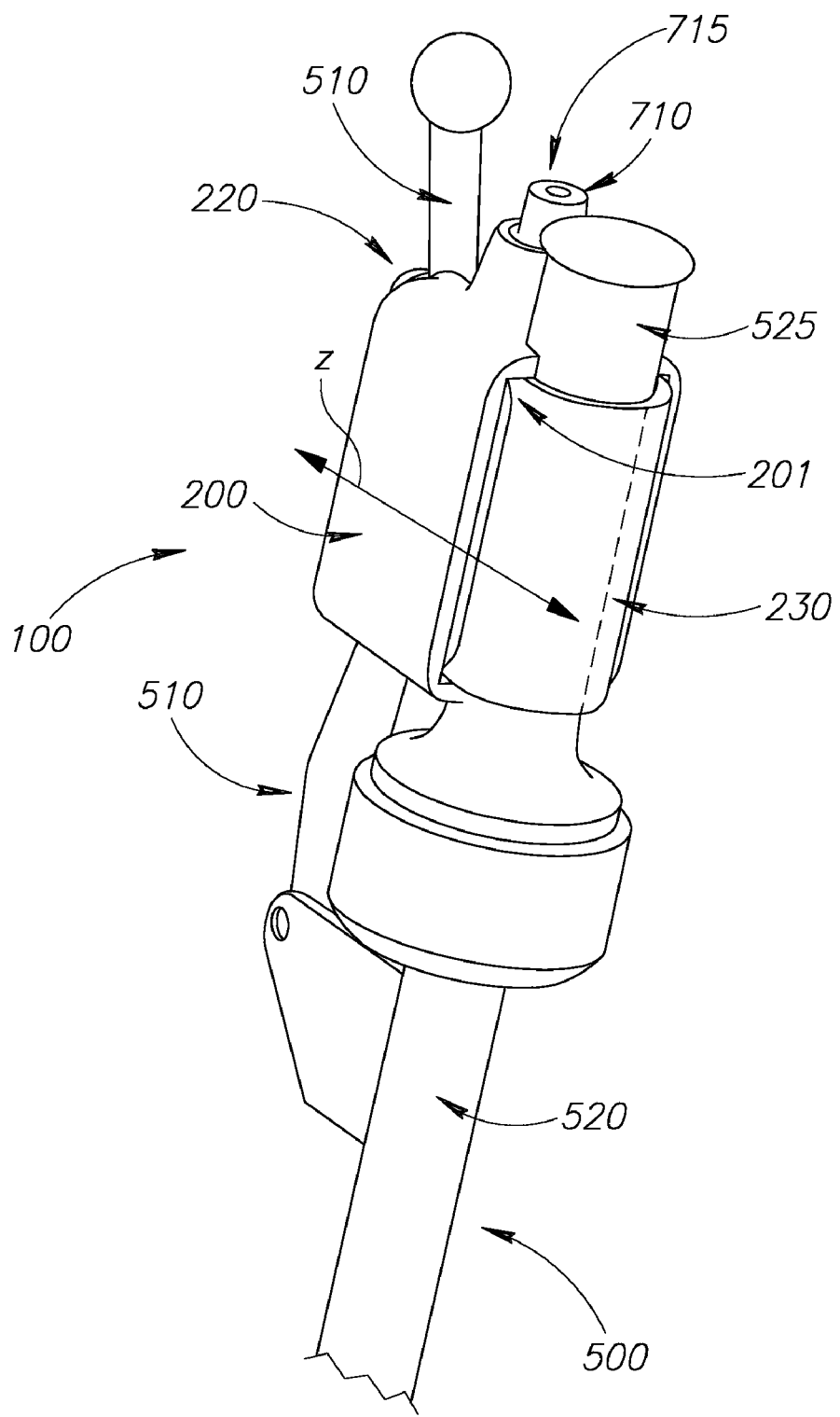
FIG. 2 is an isometric side view of a theft prevention device for a two-wheeled vehicle, according to some embodiments of the present invention.

According to some embodiments of the invention, as illustrated in FIGS. 1-2, the theft prevention device 100 may be installed on a grip 525 of the vehicle's 500 handlebar 520 that is connected to a brake-lever 510 of the vehicle 500 (usually the right handlebar 520).

The theft prevention device 100 may serve both as a deterring device and as a lock, preventing unauthorized people such as thieves from stealing the vehicle 500.

The size of the components of the theft prevention device 100 and its components may be designed to fit standard handlebars 520 and brake-levers 510 of motorbikes, bicycles, or any other type of two-wheeled vehicle 500.

The prominent location, on the handlebar grip 520, and the considerable size, covering a significant portion of handlebar grip 520, render embodiments of the present invention highly visible. Such high visibility not only create an unambiguous visual deterrent to would-be thieves but also provide a clear reminder to the user not to ride off with the device in place. Thus, embodiments of the present invention may provide the user with a sense of confidence that the two-wheeled vehicle 500 is well protected.

Embodiments of a theft prevention device 100 for a two-wheeled vehicle 500 according to the present invention offer a number of other advantages, including:

Installation and removal of the present invention is simple and rapid, requiring no tools;

Use of the present invention is practical and straightforward; theft prevention device 100 may be engaged by depressing a lock button 110, and requires only a key to disengage the lock;

Engaging the present invention moves the brakes to a closed, or braked, position and prevents right handlebar grip 520 from rotating;

The present invention is quite portable, its size and weight making it convenient to store and transport when not being used; and The present invention will fit most types of two-wheeled vehicles 500 and can be transferred from one two-wheeled vehicle 500 to another without requiring any adjustments.

Figure 3:
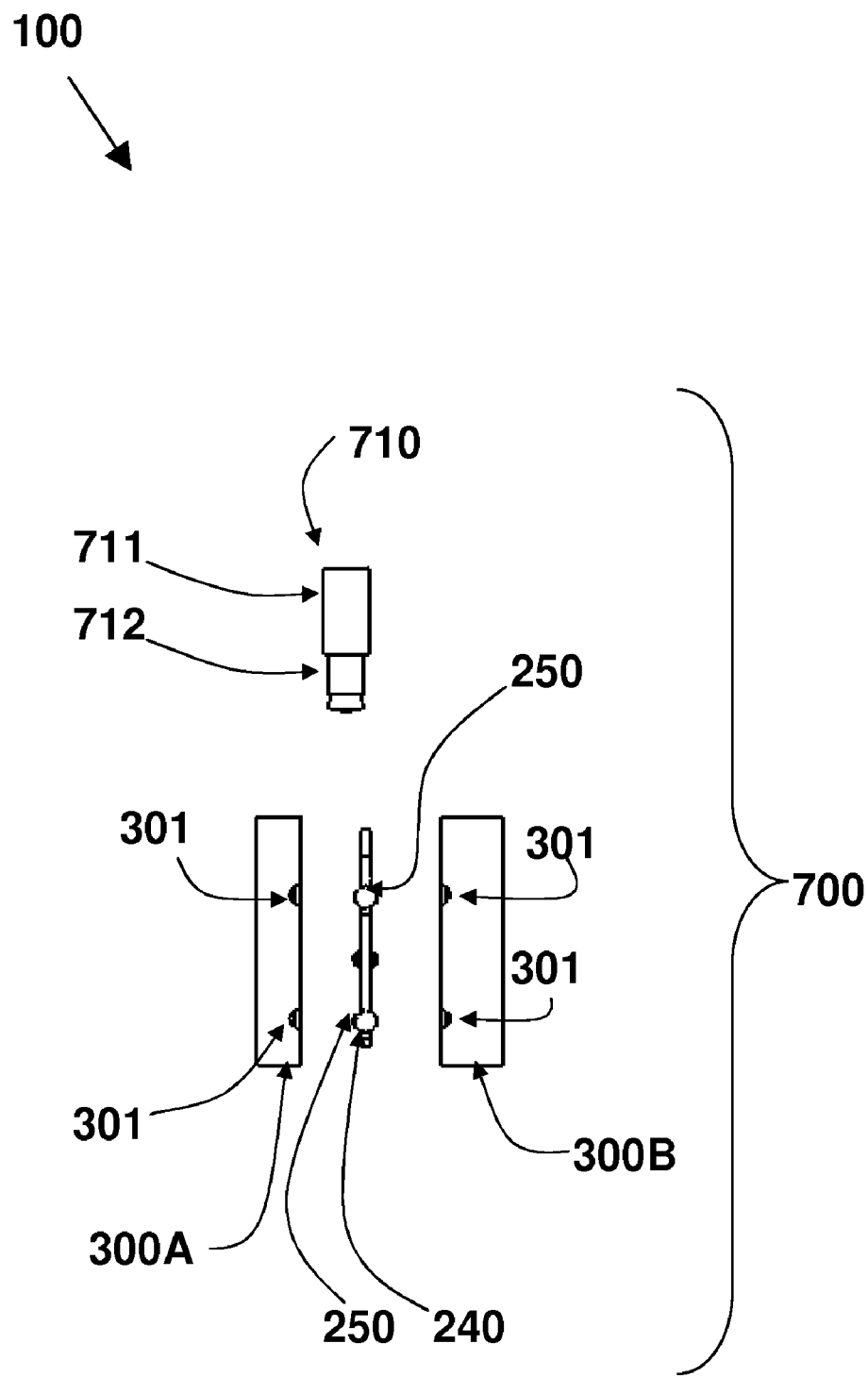
FIG. 3 is an isometric exploded view of a lock assembly of a theft prevention device, according to some embodiments of the present invention.

According to embodiments of the present invention, as illustrated in FIGS. 1-3, provide a theft prevention device 100 for a two-wheeled vehicle 500 that encircles the handlebar grip 520 and brake-lever 510 connected thereto, of the two-wheeled vehicle 500.

According to these embodiments, the theft prevention device 100 may comprise:

a housing 200 disposed between the handlebar 520 grip 525 and brake-lever 510 of the two-wheeled vehicle 500;

a handlebar cuff 230 that is slidably attached to the housing 200 and, together with the housing 200, encircles the handlebar grip 525;

a brake-lever cuff 220 that is slidably attached to the housing 200 and, together with the housing 200, encircles the brake-lever 510; and a lock assembly 700 that is operatively associated with the cuffs 220 and 230 and is located in the housing 200.

According to some embodiments of the invention, the lock assembly 700 may be housed by the housing 200, which may also movably hold the cuffs 220 and 230 through openings 201, enabling to the lock cuffs 220 and 230 onto the brake-lever 510 and the handlebar grip 525, respectively, by approximating the cuffs 220 and 230 to the brake-lever 510 and handlebar grip 525 and then locking them in that approximated position, using the lock assembly 700.

According to some embodiments of the invention, as illustrated in FIGS. 1-3, the cuffs 220 and 230 can open and lock by increasing and decreasing the space created between the circumference walls of the cuffs 220 and 230 and housing 200 of device 100. To open or close the cuffs 220 and 230, the cuffs 220 and 230 can be moved substantially along a pre-defined axis "Z", as shown in FIGS. 1-2. To lock the cuffs 230 and 220 onto the handlebar grip 525 and the brake lever 510, respectively, the cuffs 220 and 230 may be moved along axis "Z" towards each other to decrease the space between each cuff 220 and 230 and the handlebar grip 525 and lever 510, preventing one from sliding the cuffs 220 and 230 along the handle grip 525 and the lever 510, whereas to unlock cuffs 230 and 220, cuffs 230 and 220 may be moved away from each other along axis "Z" to increase the space between the cuffs' 230 and 220 walls and the grip 525 and lever 510 allowing an authorized user to remove the theft prevention device 100 from the handlebar 520 and from the lever 510 by sliding the unlocked cuffs 220 and 230 along their respective lever 510 and grip 525.

The lock assembly 700 may allow holding the cuffs 220 and 230 in a locked position, where the handlebar cuff 220 tightly cuffs the handlebar grip 525 and the brake-lever cuff 230 tightly cuffs the brake-lever 510, as illustrated in FIGS. 1-2.

According to some embodiments, the housing 200 may be further equipped with, for example, rubber material, seals, gaskets or other protective material that enable sealing the gaps around the openings where, inter alia, the brake-lever cuff 220 and the handlebar cuff 230 enter housing 200. The shape of the housing 200, together with such protective material may defend against tampering with the components contained within housing 200 as well as preventing water, dust, and other contaminants from entering housing 200.

The lateral sides of the housing 200 may be configured to receive the corresponding brake-lever 510 and handlebar grip 520.

According to embodiments, housing 200 of theft prevention device 100 may be constructed from sturdy, tamper-resistant material, such as, for example, hardened steel that is able to withstand theft attempts. It is understood that many other materials and configurations could also be used in order to provide a long-lasting and sturdy housing 200.

According to some embodiments of the present invention, the interior surface of the brake-lever cuff 220 may be enhanced with, for example, heavy-duty memory foam material. This material may serve a twofold purpose. The material offers protection against the accidental scratching and marring of the brake-lever 510 during use. The material may also enhance the gripping power of brake-lever cuff 220 to grip brake-lever 510 because the flexible nature of such material allows the surface contact area to be increased as well as creating additional friction.

According to some embodiments, the material comprising the brake-lever cuff 220 may be a fiberglass and epoxy composite over steel. It is understood, however, that other materials may be used for in order to provide a robust and sturdy brake-lever cuff 220.

Figure 4:
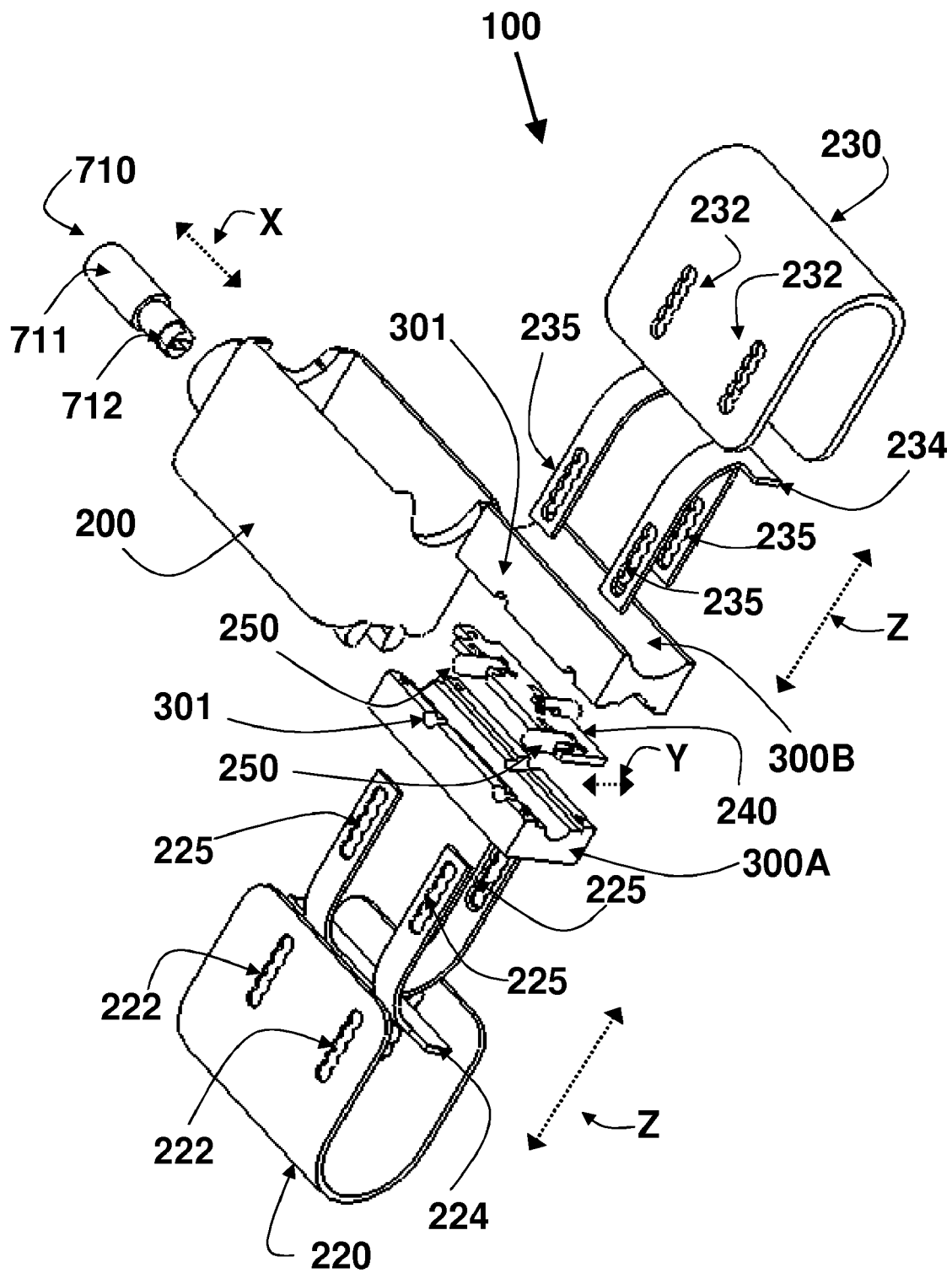
FIG. 4 is an isometric exploded view of a theft prevention device for a two-wheeled vehicle, according to some embodiments of the present invention.

According to some embodiments of the invention, as illustrated in FIGS. 3-4, the lock assembly 700 may comprise:

- A lock button 710, which may comprise two cylinders: an external cylinder 711 and an internal cylinder 712, coaxially engaged;
- A pin plate 240 having at least one plate channel 241 perforated there through;
- At least one pin 250, which is a protruding element movably connected to the plate 240;
- A first core half 300A; and
- A second core half 300B;

where each of the cuffs 220 and 230 comprises at least one serrated channel 222 and 232 respectively, each channel enabling to receive a pin 250 there through to block the movement of the cuffs 220 and 230 along the Z axis, once the pins 250 are inserted through the serrated channels 222 and 232.

As illustrated in FIG. 4, the core halves 300A and 300B, are shaped to receive the pin plate 240 therein along with the pins 250 movably connected to the plate 240. Each core half 300A and 300B may comprise niches 301 creating perforations when connecting the two halves 300A and 300B, where the perforations are adapted to receive the pins 250 there through, to allow the pins 250 to pop out and in of the perforations, according to the locking position.

Figure 5:
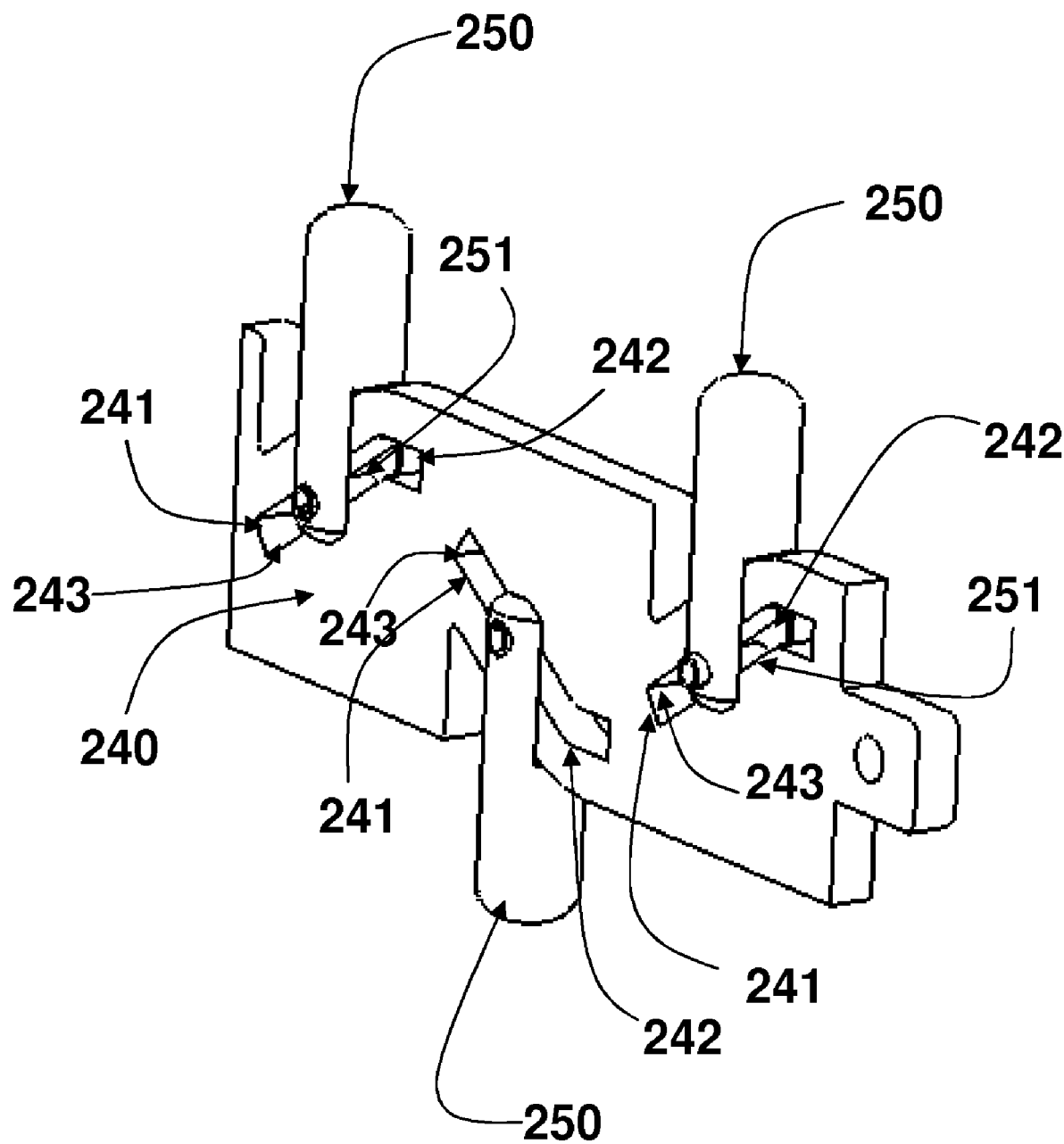
FIG. 5 is an isometric view of a pin plate and the accompanying pins, which is a part of the lock assembly of the theft prevention device, according to some embodiments of the present invention.

According to some embodiments of the invention, as illustrated in FIGS. 4-5, once the lock button 110 is pushed inwards, it enables the plate 240 to move along a predefined "X" axis and thereby push the pins 250 outwardly in a perpendicular "Y" direction, enabling the pins 250 to pop out and therefore be inserted into the serrated channels 222 and 232 of the cuffs 220 and 230, once the cuffs 220 and 230 are in a closed position after they are approximated towards each other in a perpendicular "Z" direction.

The core halves 300A and 300B may be attached to one another by any attachment means known in the art.

Figure 7:
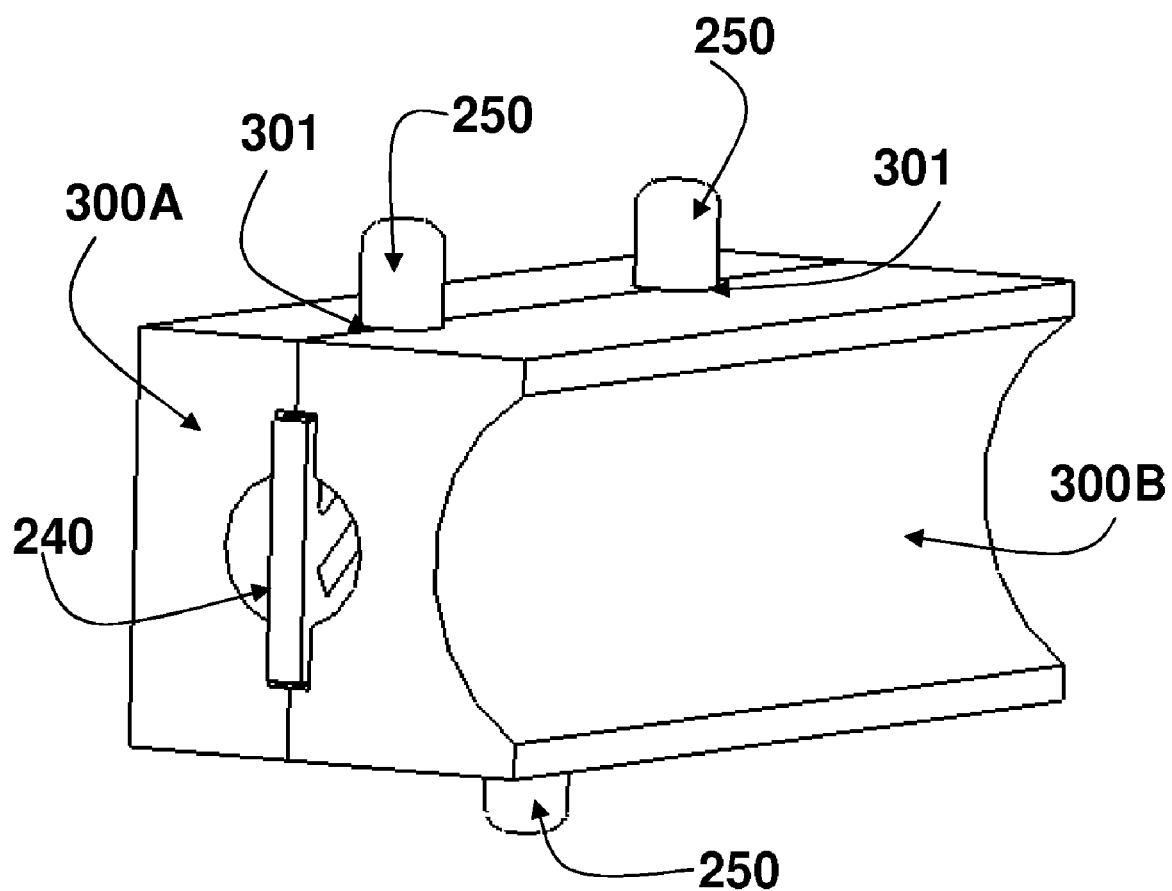
FIG. 7 is a perspective view of the two halves that comprise a core of a theft prevention device for a two-wheeled vehicle, according to some embodiments of the present invention.

According to some embodiments of the invention, as illustrated in FIG. 7, the core halves 300A and 300B, holding the plate 240 and pins 250 therein, may be held by and inside the housing 200. Additionally, one side of each cuff 220 and 230 may be longer than the other, where the cuffs 220 and 230 may be held in the housing 200 in such a manner that enables the two cuffs 220 and 230 to engage one into another in an interlocking manner in the locked position.

According to some embodiments of the invention, as illustrated in FIG. 5, the each pin 250 may be movably connected to a single plate channel 241 through a connector 251, where each pin 250 has two protruding ends enabling to connect through the connector 251. Each connector 251 may freely slide inside a plate channel 241 in which it is inserted.

Additionally, as illustrated in FIGS. 4-5, the plate channels 241 may be configured as angular perforated channels comprising a first channel 242 directed at a first direction and a second channel 243 integrally continuing the first channel 242, which may be directed at a perpendicular direction to the movement direction of the plate 240 "X", which is marked in FIG. 4 as "Y", where "Y" is the axis and direction of the pins' 250 movement.

According to these embodiments, the angular configurations of the plate channels 241 enable the pins 250 to pop out by moving along the "Y" axis outwardly and away from the plate 240, when the plate is moved in one direction along the "X" axis, where each pin 250 may eventually be positioned in the second channel 243 in the pop out locked position. Accordingly, to reach an unlocked or open position, where the pins 250 are in the far edges of their corresponding first channels 242, the plate 240 may be moved in the opposite direction along the "X" axis.

The lock button 710 may enable pushing the plate 240 back and forth along the "X" axis to lock and unlock the cuffs 220 and 230 in an approximated position, by enabling to cause the pins 250 to pop out of the plate 240 and the attached core halves 300A and 300B ("the core 300"), where they can be inserted through the cuffs' 220 and 230 serrated channels 222 and 232, respectively.

Figure 6:
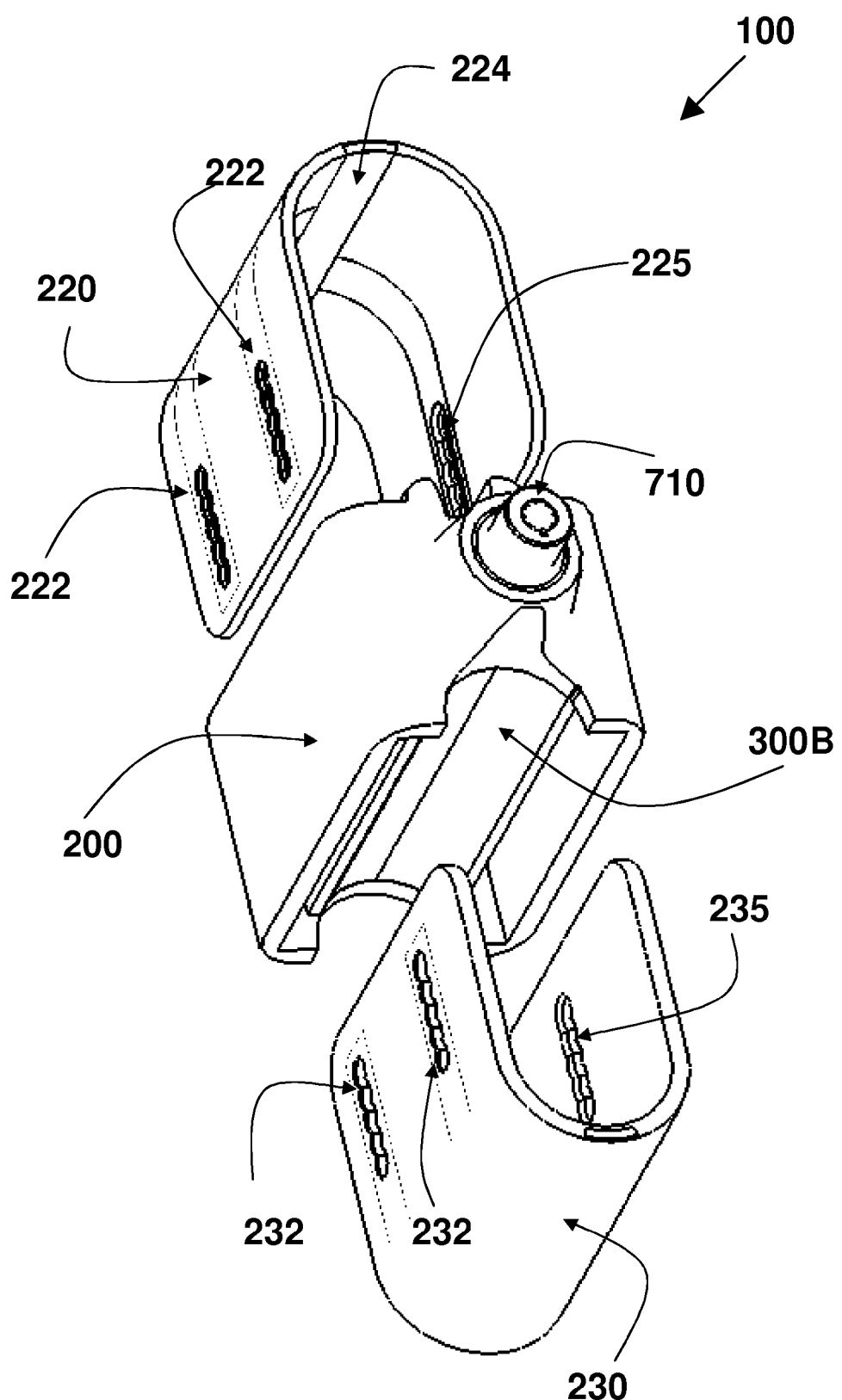
FIG. 6 is a perspective view of the theft prevention device for a two-wheeled vehicle, showing cuffs of the device in an exploded view, according to some embodiments of the present invention.

According to some embodiments of the present invention, as illustrated in FIGS. 4-6, the brake-lever cuff 220 and/or the handlebar cuff 230 may be further equipped with a reinforcing straps 224 and/or 234, respectively, each strap 224 or 234 disposed within inner walls of the cuff 220 or 230 and fits over left core half 300A or 300B. Each strap 224 and 234 may comprise serrated channels 225 and 235 adapted to fit the positioning of the cuffs' 220 and 230 serrated channels 222 and 232 respectively and to receive the pins 250 in the locked position when the pins 250 are popping out of the core 300.

The reinforcing straps 224 and 234 may be made from, for example, a steel reinforcing member used to provide additional strength and tamper resistance to the cuffs 220 and 230.

Figure 8:
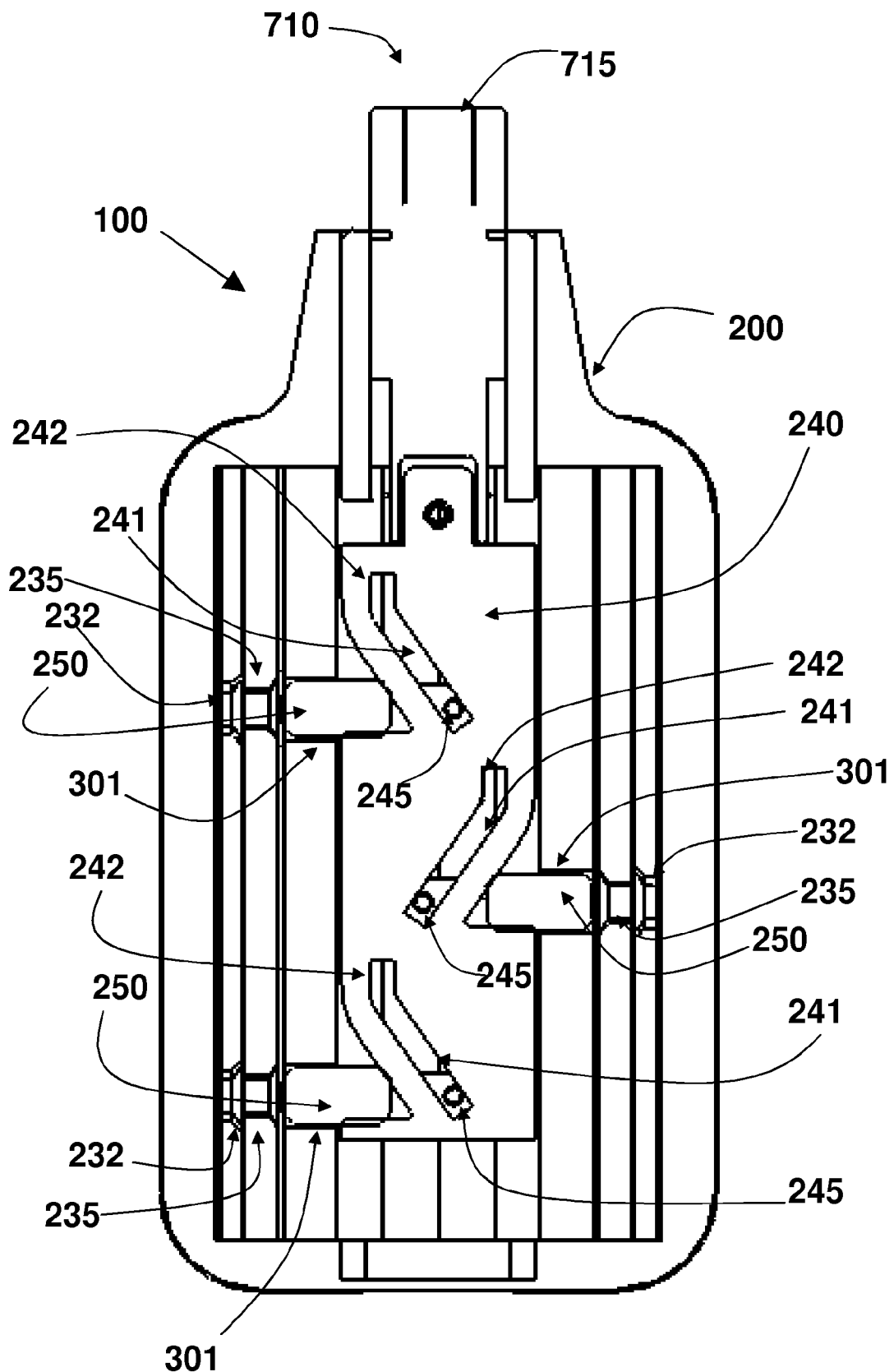
FIG. 8 is a sectional view of the theft prevention device for a two-wheeled vehicle, where the pins are in a withdrawn position and the device is in an unlocked position, according to some embodiments of the present invention.
Figure 9:
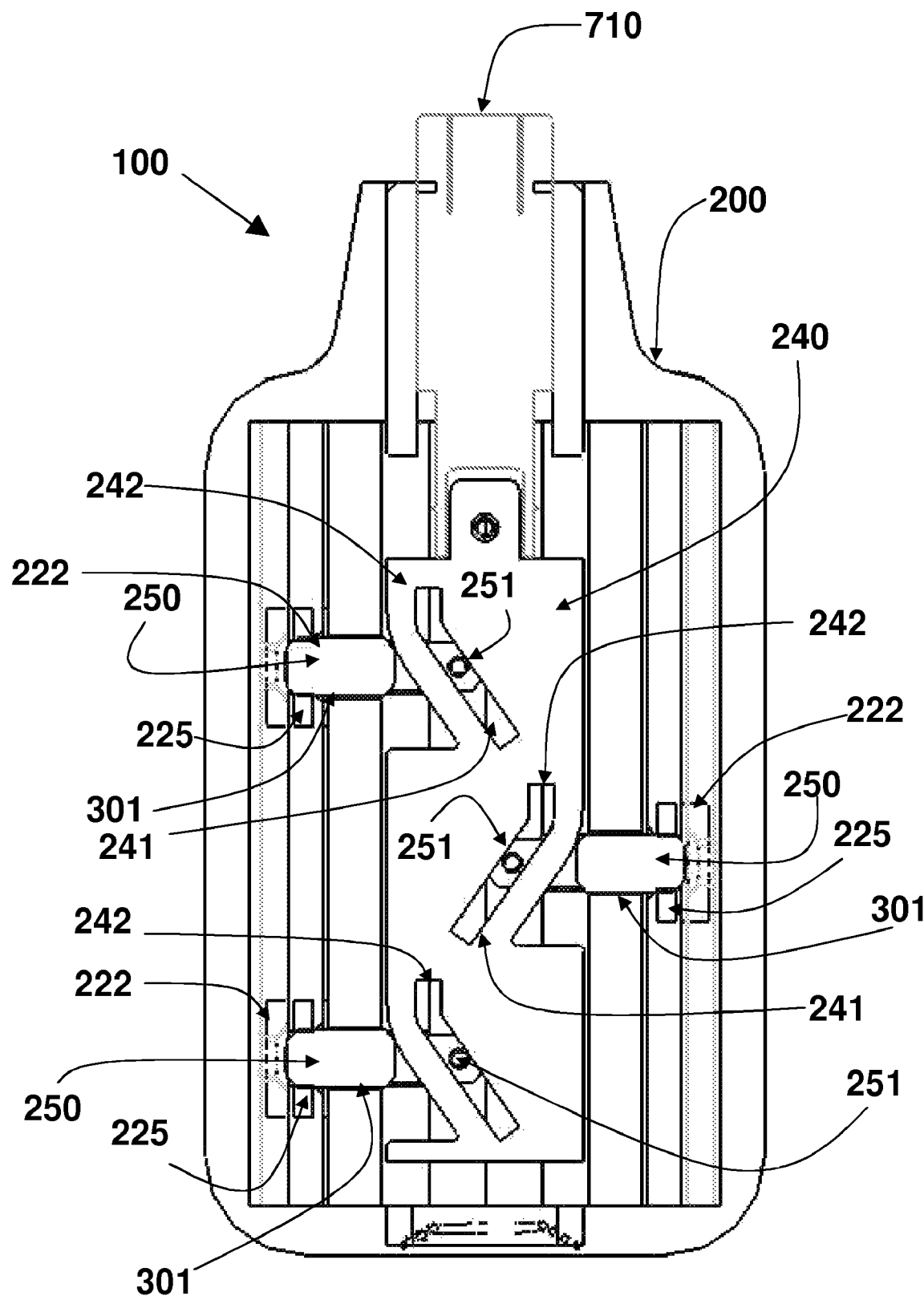
FIG. 9 is a sectional view of a theft prevention device, where the pins are held in a semi-withdrawn position and the device is in semi-locked position, according to some embodiments of the present invention.
Figure 10:
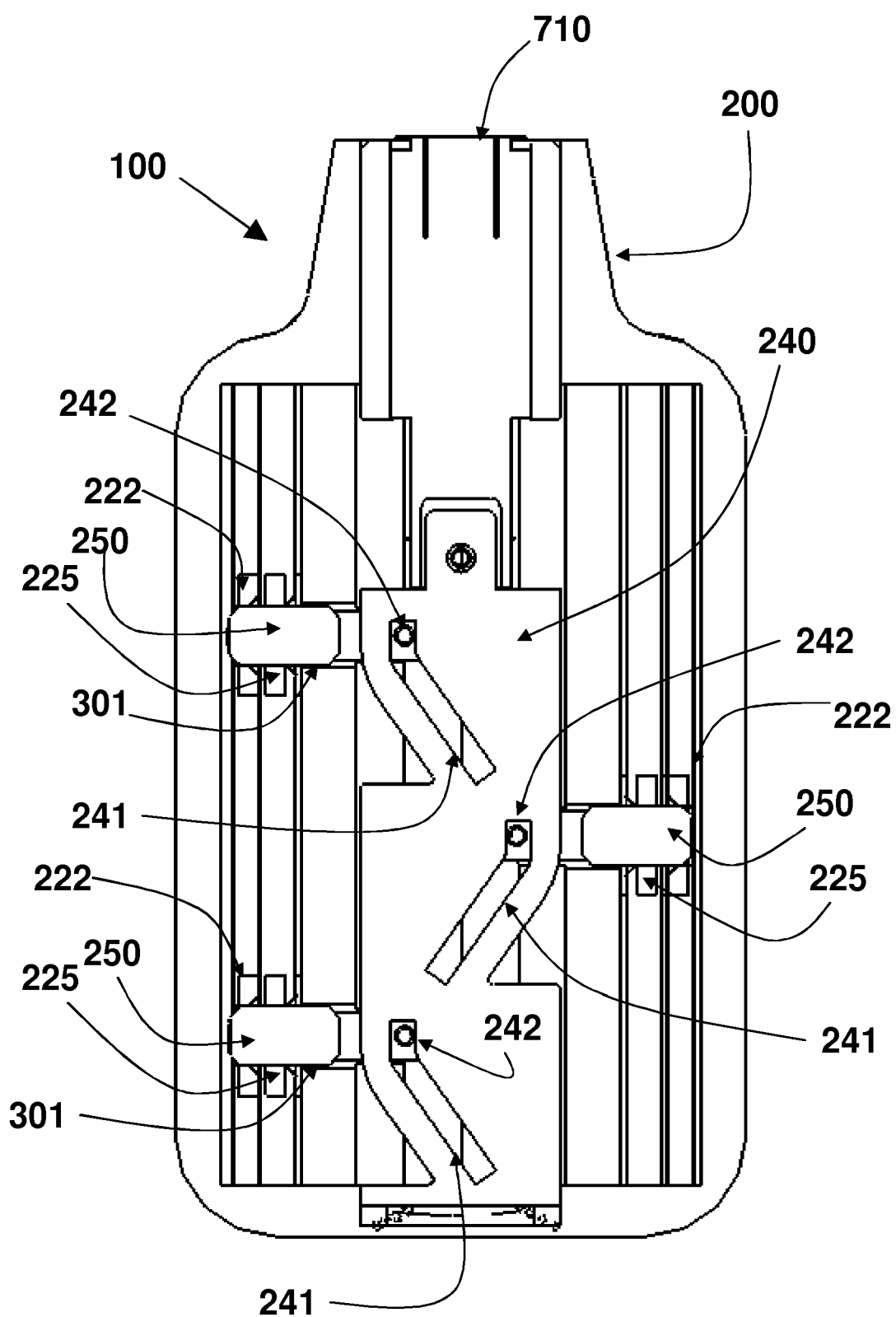
FIG. 10 is a sectional view of a theft prevention device, where the pins are held in a protruding position and the device is in a locked position, according to some embodiments of the present invention.

FIGS. 8-10 show section views of the theft prevention device 100 in unlocked, semi-locked and locked positioned, according to some embodiments of the invention.

In the unlocked position, as illustrated in FIG. 8, the pins 250 are in a withdrawn position and do not reach the serrated channels 222, 232, 225 or 235 of the cuffs 220 and 230 and reinforcement straps 224 and 234.

In the semi-locked position, as illustrated in FIG. 9, the pins 250 are in a semi-withdrawn position, where the are inserted through the serrated channels 225 and 235 of the reinforcement straps 224 and 234, yet do not reach the serrated channels 222 and 232 of the cuffs 220 and 230.

In the locked position, as illustrated in FIG. 10, the pins 250 are in a protruding position and are inserted through the serrated channels 222, 232, 225 and 235 of the cuffs 220 and 230 and reinforcement straps 224 and 234.

According to some embodiments of the invention, the brake-lever cuff 220 is able to introduce sufficient compressive force on the brake-lever 510 to disable the use of the brake-lever 510, which in turn, forces the front brake of the vehicle 500 to remain engaged. Accordingly, the handlebar cuff 230 is able to introduce sufficient compressive force on the handlebar grip 525 to prevent rotation of the throttle, if the vehicle 500 is a motor-based one in which the grip 525 serves as the gas handle.

When the brake-lever cuff 220 and the handlebar cuff 230 are suitably adjusted, the theft prevention device 100 may prevent normal operation of the two-wheeled vehicle 500 by, for example, applying sufficient pressure to substantially immobilize the brake-lever 510, which holds the front brakes in a braked position, and to prevent the throttle on the handlebar grip 525 from rotating, as well as preventing the unauthorized user from clutching the brake-lever 510 towards the grip 525 by blocking it by the housing 200 situated between the cuffs 220 and 230.

Reference is now made to FIGS. 11A, 11B, 12, 13, 14, 15A, 15B and 16, which schematically illustrate a theft prevention device 100' and some of its optional components, according to other embodiments of the invention.

Figure 11A:
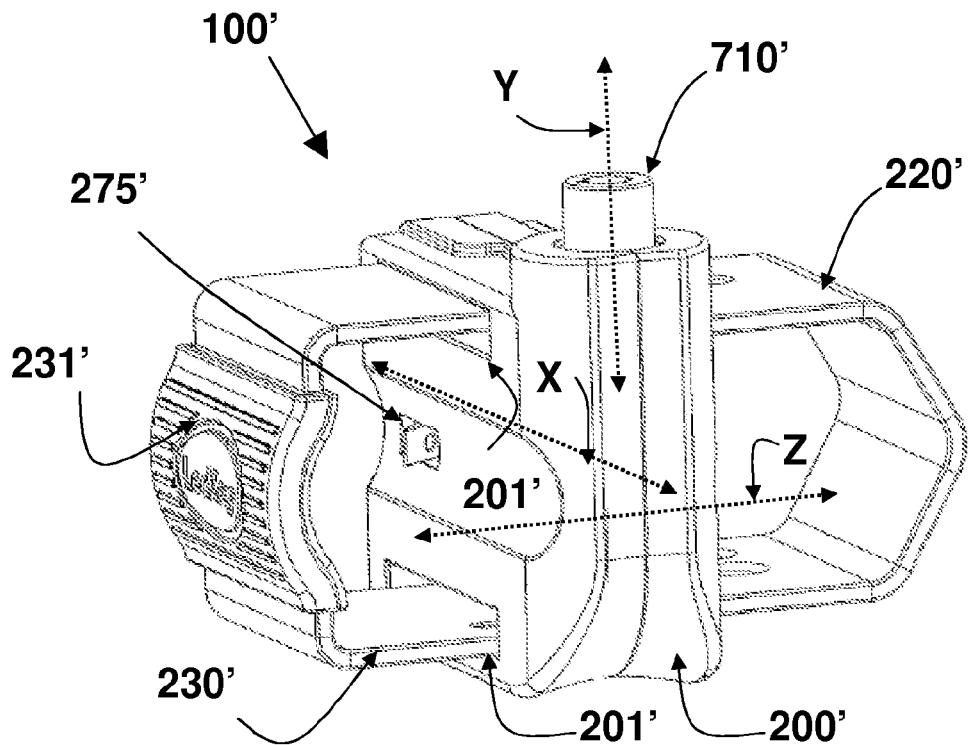
FIGS. 11A and 11B schematically illustrate a theft prevention device, according to other embodiments of the present invention.
Figure 11B:
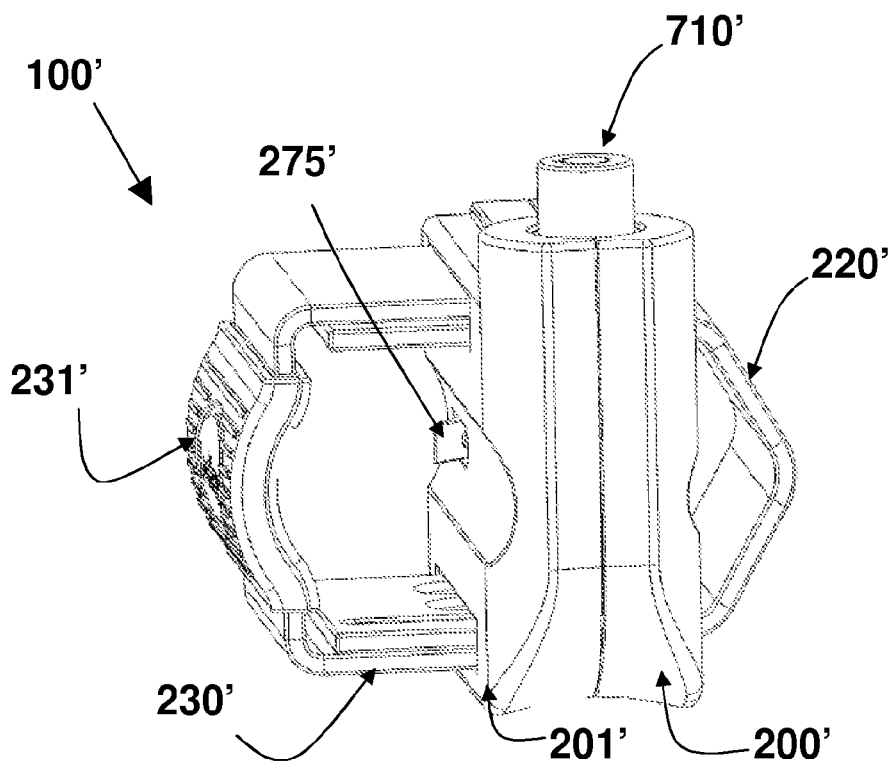

According to these embodiments, as illustrated in FIGS. 11A and 11B, where FIG. 11A illustrates the device 100' in an unlocked position and FIG. 11B illustrates the device 100' in a locked position the theft prevention device 100' may comprise:

A brake-lever cuff 220';
A handlebar cuff 230';
A housing 200';
A lock assembly 700'; and
A pulling-resistance mechanism 270'.

According to these embodiments, a lock button 710' of the lock assembly 700' may be moved along a predefined axis "Y", which is perpendicular to the axis along which the pin plate 240' is moved and parallel to the axis "X" along which the pins 250' are moved.

As illustrated in FIGS. 11A and 11B, to lock the device 100', the authorized user is required to insert the two-wheeled vehicle's 500 handlebar grip 525 through the handlebar cuff 230', the brake-lever 510 through the brake-lever cuff 220', approximate the cuffs 220' and 230' to one another by sliding the cuffs 220' and 230' along a predefined "Z" axis perpendicular to both "X" and "Y" axes through openings 201' in the housing 200' adapted to allow the cuffs 220' and 230' to slide in one another in an interlocking manner, as illustrated in FIG. 11B and finally, when the cuffs 220' and 230' are approximated to cuff the brake-lever 510 and handlebar 520, the lock button 710' may be pressed to lock the cuffs 220' and 230' in the interlocking cuffing position.

Figure 12:
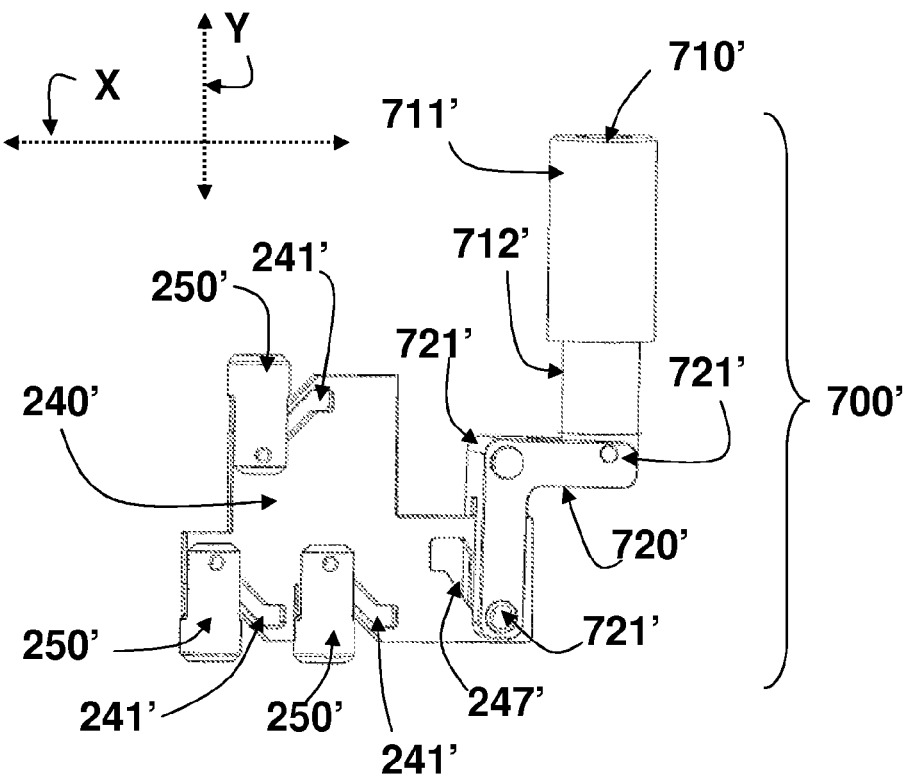
FIG. 12 is a schematic illustration of a lock assembly of the theft prevention device, according to the other embodiments of the present invention.

According to some embodiments of the invention, as illustrated in FIG. 12, the lock assembly 700' of the theft prevention device 100' may comprise similar components described in the previous set of embodiments:

At least one pin plate 240';
At least one pin 250';
A lock button 710'; and
At least one connecting member 720'.

According to some embodiments of the invention, as illustrated in FIG. 12, the connecting member 720' may be an L shaped member enabling to movably connect the pin plate 240' and the lock button 710' and transmit the vertical movement of the lock button parts 711' and 712' along the "Y" axis into a horizontal movement of the pin plate 240' along the "X" axis. This means that when the lock button 710' is pushed downwards, the connecting member 720' enables pushing the pin plate 240' to the left (according to the illustrated FIG. 12) thereby enabling the pins 250', movably connected thereto to protrude outwardly from the plate 240' moving along the "Y" axis, perpendicular to the pin plate 240'.

Similarly to the former set of embodiments, the pin plate 240' may comprise plate channels 241' where each pin 250' is movably connected to the plate 240' through the channels 241'. Each channel 241' may have an angular shape where one of the sides of the shaped channel 241' is parallel to the "X" axis, which is the movement direction of the plate 240'. The pins 250' may protrude the plate 240' when they reach the parallel part of the channel 241'. When the plate 240' is moved along the "X" axis by the movement lock button 710' and through the connecting member 720', the plate's 240' movement pushes the pins 250' inside their corresponding channels 241' thereby allowing the pins 250' to reach the parallel part and therefore protruding outwardly from the plate 240' along the "Y" axis.

According to some embodiments of the invention, as illustrated in FIG. 12, the inner cylinder 712' of the lock button 710' may be connected to one end of the connecting member 720' through a hinge 721'. Additionally, the other end of the connecting member 720' may be movably connected to the pin plate 240' through another hinge 721', where the hinge 721' may be movably situated in another angular channel 247' perforated in the pin plate 240'.

Figure 13:
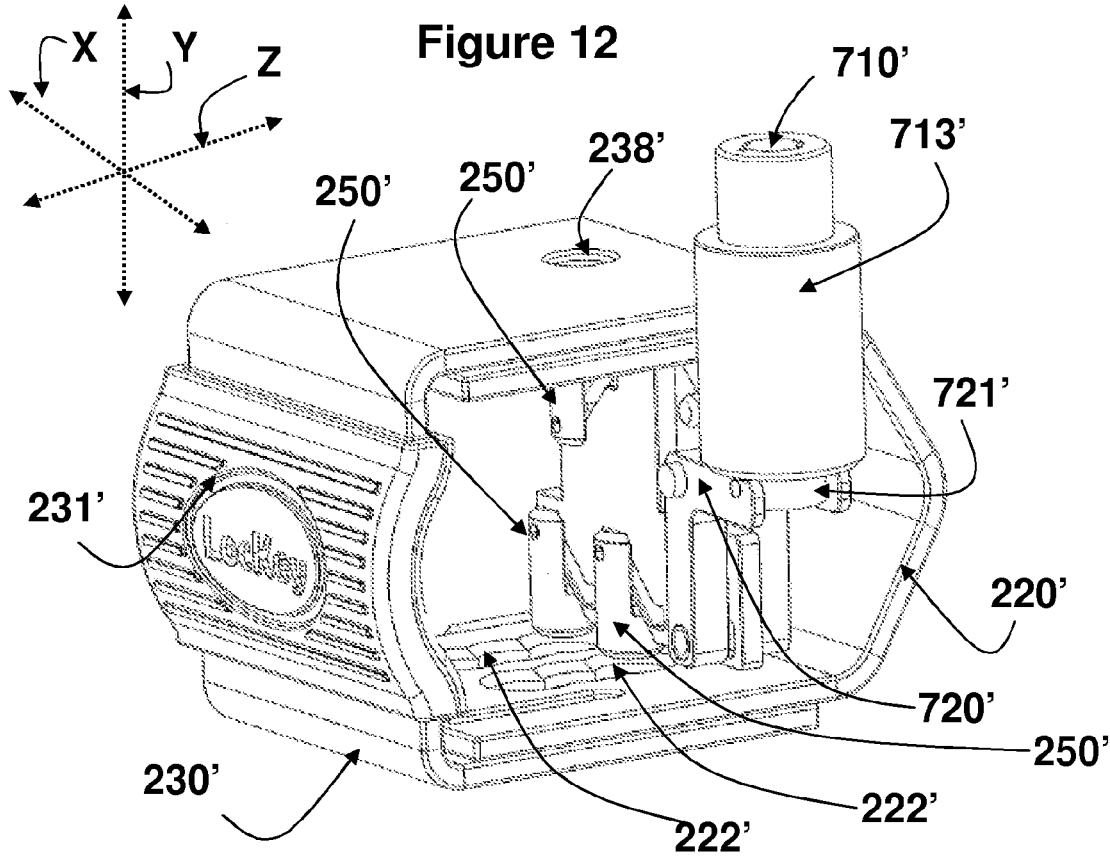
FIG. 13 is a schematic illustration of a lock assembly and cuffs of the theft prevention device, according to the other embodiments of the present invention.

As illustrated in FIG. 13, the cuffs 220' and 230' are in a locked position, engaging each other in an enveloping manner, where one cuffs 230' arms are envelope the arms of the other cuff 220'. Once the cuffs 220' and 230' are cuffed to the vehicle's 500 lever 510 and handlebar 520, the pins 250' may be located in front of the serrated channels 222' of at least one of the cuffs 220', to allow protruding into the holes of the serrated channel 222' to securely lock the device 100'.

Figure 14:
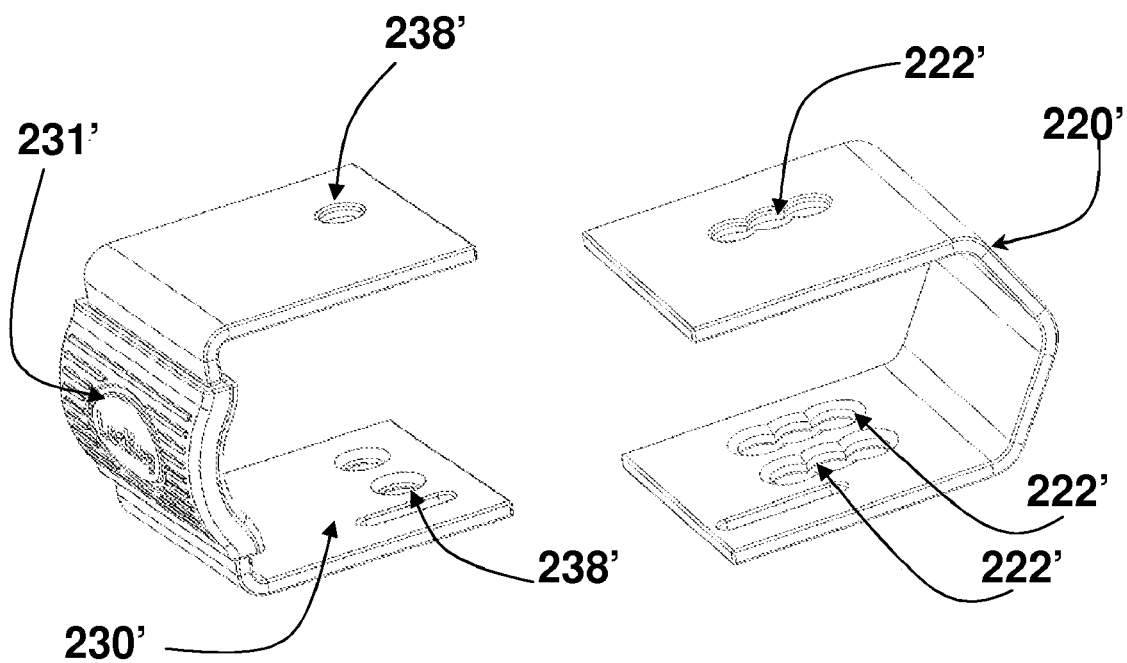
FIG. 14 is a schematic illustration cuffs of the theft prevention device, according to the other embodiments of the present invention.

Additionally, the enveloping cuff 230' may comprise one or more holes 238' instead of serrated channels which are positioned in such a location that enables each hole 238' to be situated above a part of the serrated channel 222' of the inner cuff 220' engaging the enveloping one, as illustrated in FIG. 13 and FIG. 14.

Additionally at least one of the cuffs 230', may comprise at least one holding member 231', which may be a cover for the part of the cuff 230' that is held by the user. The holding member 230' may be made from any material or/and have the shape that increases the friction and facilitates in enhancing the grip of the user's hand in the cuff 230'. For example, the holding member 231' may be made of rubbery materials (rubber and/or polymeric materials that have the rubbery feel) having a non-uniform or an unsmooth surface.

Figure 15A:
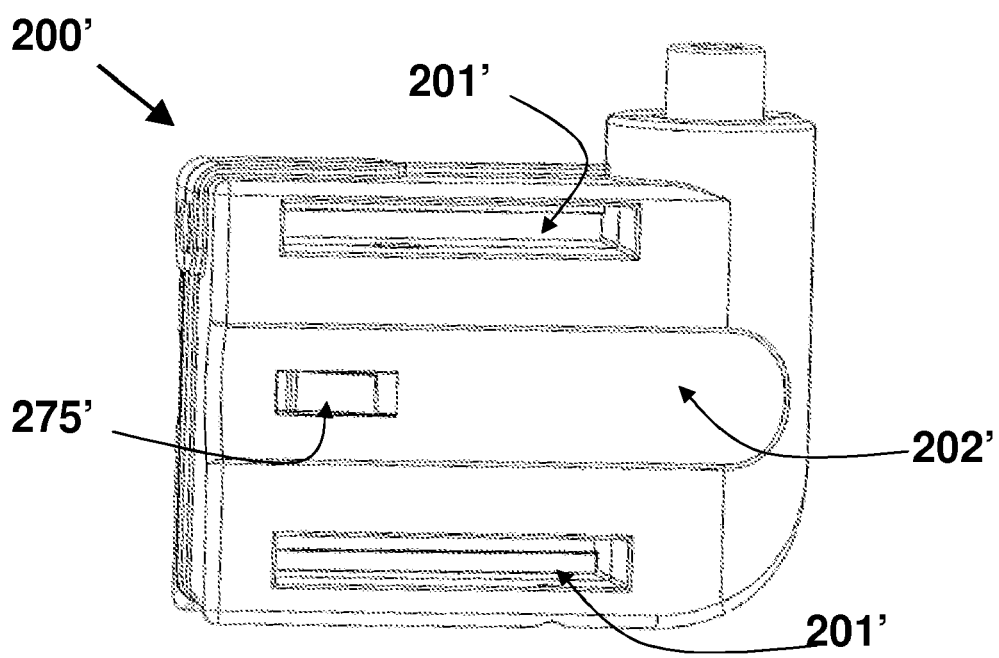
FIGS. 15A and 15B schematically illustrate a housing of the theft prevention device in a side and isometric views, respectively, according to the other embodiments of the present invention.
Figure 15B:
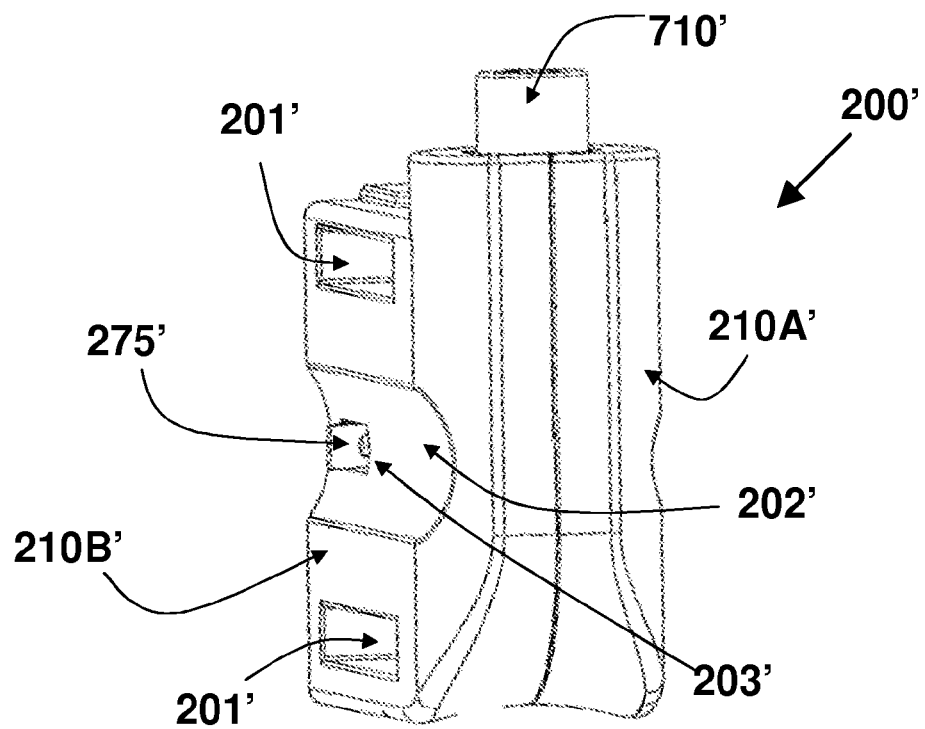

FIG. 15A and FIG. 15B schematically illustrate the housing 200' of the theft prevention device 100', according to the other embodiments of the invention. According to these embodiments, the housing 200' may be made from at least two separate parts 210A and 210B that are attached to one another to house the plate 240', pins 250' and other elements of the device 100'. The housing 200' may comprise two openings 201' each enables two cuff arms (one of each cuff 220' and 230') that are coupled to one another to be inserted through each opening 201'.

The housing 200' sides may have sunken parts 202' at each side that faces each cuff 220' and 230', where each sunken part 202' may be designed to fit the diameter and/or shape of it's corresponding brake-lever 510 or handlebar grip 525, to allow close engagement between each sunken part 202' and lever/grip 510/525.

Figure 16:
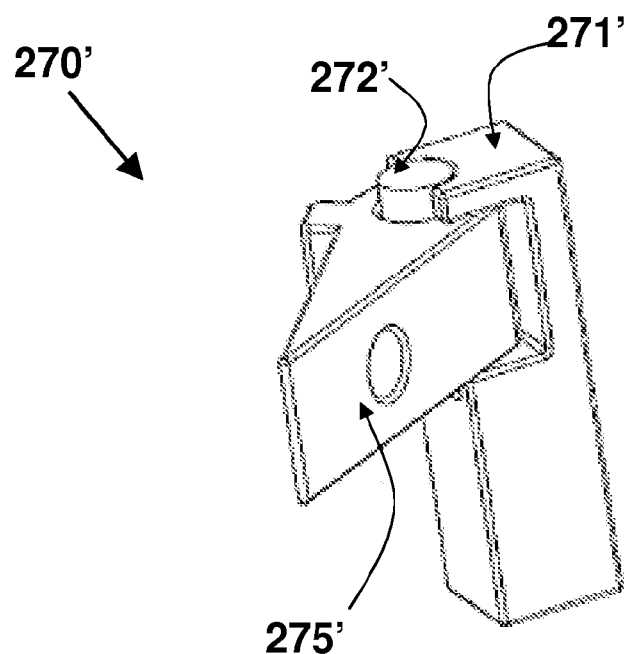
FIG. 16 is a schematic illustration of a pulling-resistance mechanism of the theft prevention device, according to the other embodiments of the present invention.

Additionally, As illustrated in FIGS. 15A, 15B and 16, the theft prevention device 100' may further comprise at least one pulling-resistance mechanism 270', which may facilitate in preventing an unauthorized person (e.g. a thief) from removing the cuffs 220' and 230' from the corresponding brake-lever 510 and handlebar grip 525 of the vehicle 500. The pulling-resistance mechanism 270' may comprise (i) at least one protruding member 275' that may protrude from at least one of the housing 200' sides (see FIG. 15B) such as from at least one of the sunken parts 202' of the housing 200' (ii) at least one holder 271' enabling to movably hold the protruding member 275'; and (iii) a pivot 272' movably connecting the protruding member 275' to the holder 271'. The housing 200' may comprise a pulling-resistance mechanism's opening 203' enabling the protruding member 275' to protrude therefrom.

The protruding member 275' may comprise a stopper 273', which may be integrally connected to the protruding member 275', enabling to block the rotation movement of the protruding member 275' in one direction by enabling to be blocked by the housing 200'. Therefore, once the cuffs 220' and 230' are cuffed to the lever 510 and handlebar grip 525, if anyone tries to pull the device 100' by trying to pull the cuffs 220' and 230' from their corresponding lever 510 and grip 525, the protruding member 275' of the pulling-resistance mechanism 270' may further attach to the surface of the grip 525 and/or lever 510, especially if the grip 525 and/or brake-lever 510 are covered by a material of high friction coefficient (such as rubber, sponge, soft elastic plastics and the like, as they usually do in the art) and/or if the protruding member 275' is made of materials of substantially high friction such as rubber.

According to another embodiment of the invention there is provided an alarm system (not shown) in operative association with the aforementioned theft prevention device. The alarm system becomes active once the lock is set to a 'locked' position. The alarm system is vibration-sensitive such that an alarm is set off responsive to vibrations above a specified level. Vibration sensitivity may be achieved by any well known technology of vibration sensors.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A theft prevention device for enabling to lock a handlebar grip and a brake-lever of a two-wheeled vehicle, where the brake-lever is movably connected to the handlebar, to facilitate in preventing an unauthorized user from stealing said vehicle, said theft prevention device comprising:
   a housing comprising at least two openings;
   a handlebar cuff that enables slidably attaching to said housing through said openings and, together with the housing, enables cuffing the handlebar grip therein;
   a brake-lever cuff that enables slidably attaching to said housing through said openings and, together with the housing, enables cuffing the brake-lever therein; and
   a lock assembly that is operatively associated with said cuffs, wherein said lock assembly enables locking the cuffs in a position where the cuffs are engaged so that they cuff the handlebar grip and the brake-lever, wherein the lock assembly comprises:
      at least one pin plate comprising at least one plate channel, which is perforated therein;
      at least one pin, movably connected to said plate, wherein each pin is movably connected to the plate through said plate channel, which enables the pin to move within the channel; and
      a lock button, operatively associated with said pin plate,
   wherein said at least one plate channel is angular, constructed of at least two integrally connected channels that create and angle therebetween to allow the pins to protrude from the plate once reaching one end of the plate channel and to withdraw inwardly once reaching the other end of the plate channel,
wherein said plate enables the pins to protrude outwardly from the plate along a predefined "X" axis, when the plate is moved along a predefined "Y" axis in one direction and to withdraw inwardly towards the plate when the plate is moved in an opposite direction along the "Y" axis,
   wherein each of said handlebar cuff and brake-lever cuff comprises at least one serrated channel, enabling the pins to insert therethrough, once the pins are in a protruding position, and thereby locking the cuffs in a locked position cuffing the grip and brake-lever, and
   wherein said lock button enables moving the pin plate along said "X" direction to lock and unlock the cuffs.

2. The theft prevention device of claim 1, wherein said lock assembly further comprises a first core half and a second core half enabling to attach to one another while holding the pin plate and said at least one pin therein,
   wherein each of said core halves comprises at least one niche enabling to create at least one perforation through which the at least one pin protrudes in the locked position of said at least one pin.

3. The theft prevention device of claim 1, wherein at least one of said cuffs comprises at least one hole, positioned in such a location that enables each hole to be situated above said at least one pin enabling to lock the sliding movement of the cuffs along the "Z" axis by allowing the at least one pin to be inserted through said at least one hole in the pin's protruding position.

4. The theft prevention device of claim 1, wherein the "Z" axis is substantially perpendicular to the "Y" axis, allowing the plate to be moved along a perpendicular axis to the movement axis of the cuffs.

5. The theft prevention device of claim 1, wherein the "Y" axis is substantially perpendicular to the "X" axis, allowing the plate to be moved along a perpendicular axis to the protrusion movement axis of the pins.

6. The theft prevention device of claim 1, wherein the "Z" axis is substantially perpendicular to the "Y" axis allowing the plate to be moved along a perpendicular axis to the movement axis of the cuffs, and
   wherein the "Y" axis is substantially perpendicular to the "X" axis, allowing the plate to be moved along a perpendicular axis to the protrusion movement axis of the pins, wherein the "X" axis is also substantially perpendicular to the "Z" axis.

7. The theft prevention device of claim 1, wherein said lock button enables moving the pin plate along said "X" direction to lock and unlock the cuffs by moving along the same "X" axis, thereby pushing the pin plate when the lock button is pressed.

8. The theft prevention device of claim 1, wherein said lock assembly further comprises a connecting member that is movably connected at one end to the lock button and at the other end to the pin plate, thereby enabling to transmit the pressing movement of the lock button to the movement of the plate, which in turn transmits the pressing movement to said at least one pin to enables said pin to protrude from said plate.

9. The theft prevention device of claim 8, wherein said pressing of the lock button is a movement along a predefined "Y" axis, wherein said connecting member enables transmitting the pressing movement of the lock button along the "Y" axis into the movement of the plate along a substantially perpendicular "X" axis.

10. The theft prevention device of claim 1, further comprising at least one reinforcement strap, wherein said reinforcement strap is disposed within inner walls of at least one of the cuff,
wherein said strap comprises at least one serrated channel adapted to fit the positioning of each of the cuffs' serrated channels to enable receiving of the at least one pin of the lock assembly therein to lock the cuffs to the handlebar grip and brake-lever.

11. The theft prevention device of claim 1, wherein said at least one pin has two protruding ends enabling to connect to one another through a connector, wherein said connector is movably inserted through said plate channel, thereby allowing the pin to move along the plate channel.

12. The theft prevention device of claim 1, wherein said lock button comprises an external cylinder and an internal cylinder, coaxially engaged therein.

13. A theft prevention device for enabling to lock a handlebar grip and a brake-lever of a two-wheeled vehicle, where the brake-lever is movably connected to the handlebar, to facilitate in preventing an unauthorized user from stealing said vehicle, said theft prevention device comprising:
 a housing comprising at least two openings;
 a handlebar cuff that enables slidably attaching to said housing through said openings and, together with the housing, enables cuffing the handlebar grip therein;
 a brake-lever cuff that enables slidably attaching to said housing through said openings and, together with the housing, enables cuffing the brake-lever therein; and
 a lock assembly that is operatively associated with said cuffs, wherein said lock assembly enables locking the cuffs in a position where the cuffs are engaged so that they cuff the handlebar grip and the brake-lever, further comprising at least one pulling-resistance mechanism, which facilitates in preventing an unauthorized person from removing the cuffs from their corresponding brake-lever and handlebar grip,
 said pulling-resistance mechanism comprising at least one protruding member that protrudes from at least one of the housing's sides; at least one holder enabling to movably hold the protruding member; and at least one pivot movably connecting said protruding member to said holder,
 wherein said housing comprises a pulling-resistance mechanism's opening enabling the protruding member to protrude therefrom, and
 wherein said protruding member enables attaching to the surface of at least one of: the grip and the brake-lever, once the cuffs are cuffed to the brake-lever and handlebar grip, when a pulling force is applied on at least one of: the handlebar grip and the brake-lever.

14. A theft prevention device for enabling to lock a handlebar grip and a brake-lever of a two-wheeled vehicle, where the brake-lever is movably connected to the handlebar, to facilitate in preventing an unauthorized user from stealing said vehicle,
 said theft prevention device comprising a housing comprising at least two openings; a handlebar cuff that enables slidably attaching to said housing through said openings and, together with the housing, enables cuffing the handlebar grip therein; a brake-lever cuff that enables slidably attaching to said housing through said openings and, together with the housing, enables cuffing the brake-lever therein; and a lock assembly that is operatively associated with said cuffs, wherein said lock assembly enables locking the cuffs in a position where the cuffs cuff the handlebar grip and the brake-lever,
 wherein said lock assembly comprises:
 at least one pin plate comprising at least one plate channel, which is perforated therein;
 at least one pin, movably connected to said plate, wherein each pin is movably connected to the plate through said plate channel, which enables the pin to move within the channel; and
 a lock button, operatively associated with said pin plate,
 wherein said at least one plate channel is angular, constructed of integrally connected channels that create and angle therebetween to allow the pins to protrude from the plate once reaching one end of the plate channel and to withdraw inwardly once reaching the other end of the plate channel,
 wherein said plate enables the pins to protrude outwardly from the plate along a predefined "X" axis, when the plate is moved along a predefined "Y" axis in one direction and to withdraw inwardly towards the plate when the plate is moved in an opposite direction along the "Y" axis,
 wherein at least one of said handlebar cuff and brake-lever cuff comprises at least one serrated channel, enabling the pins to insert therethrough, once the pins are in a protruding position, and thereby locking the cuffs in a locked position cuffing the grip and brake-lever, and
 wherein said lock button enables moving the pin plate along said "X" direction to lock and unlock the cuffs.

* * * * *